May 7, 1963 R. L. JAESCHKE 3,089,046
LIQUID-COOLED AND -LUBRICATED ELECTRIC MACHINE
Filed March 28, 1960 2 Sheets-Sheet 2

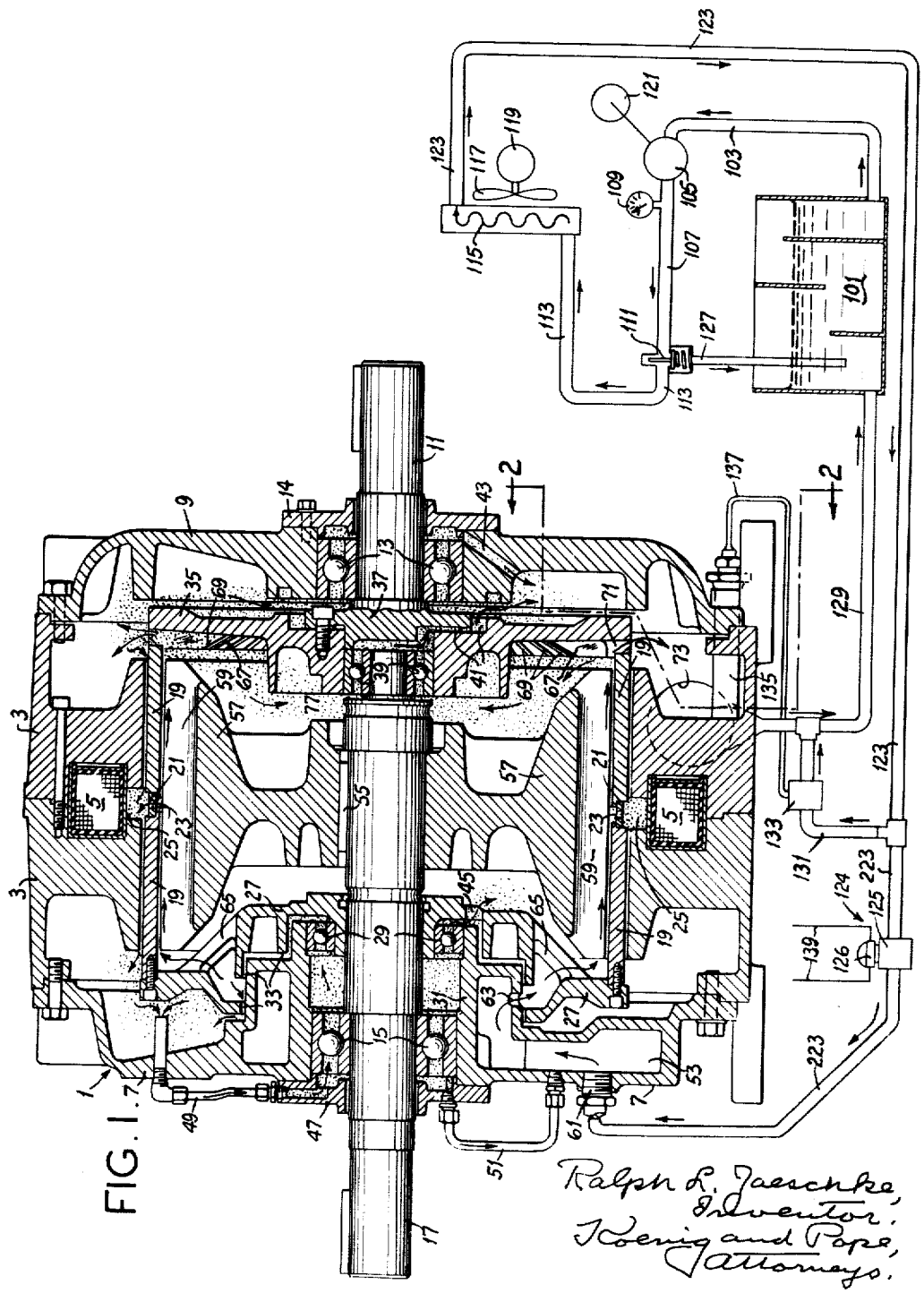

Ralph L. Jaeschke,
Inventor,
Koenig and Pope
Attorneys.

United States Patent Office 3,089,046
Patented May 7, 1963

3,089,046
LIQUID-COOLED AND -LUBRICATED
ELECTRIC MACHINE
Ralph L. Jaeschke, Kenosha, Wis., assignor to Eaton Manufacturing Company, Cleveland, Ohio, a corporation of Ohio
Filed Mar. 28, 1960, Ser. No. 17,991
5 Claims. (Cl. 310—105)

This invention relates to liquid-cooled electric machines, and with regard to certain more specific features, to liquid-cooled electric couplings of the eddy-current type.

Among the several objects of the invention may be noted the provision of an improved oil-cooled coupling in which some of the coolant oil is employed in controlled quantity for the purpose of nonexcessive lubrication of its bearings; the provision of an oil-cooled coupling of the class described which requires no separate pressure system for the bearing lubrication; and the provision of a coupling of this class adapted to be served by a lubricant and coolant circulating system which minimizes the size of pump motors such as required for coolant and lubricant circulation. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, FIG. 1 is an axial section of a typical eddy-current coupling, showing application of the invention thereto, certain oil circuits being shown diagramatically;

Corresponding reference characters indicate corresponding parts throughout the several views of the drawings.

Figure 3:
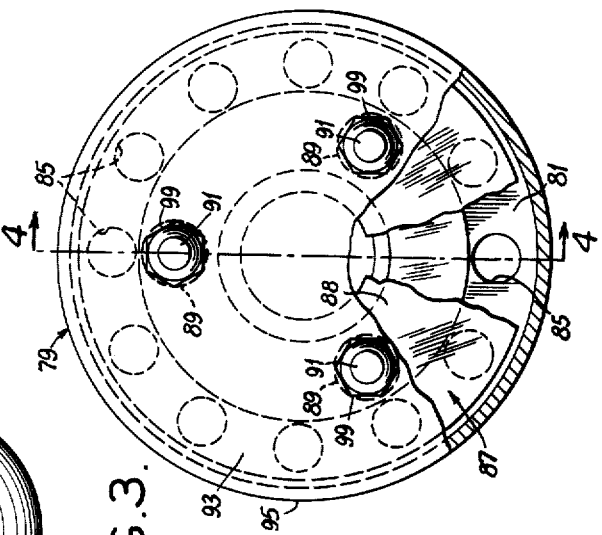
FIG. 3 is an enlarged plan view of a fire-proofing vent device.

Several methods have heretofore been employed for cooling and lubricating eddy-current electric couplings. In general, the cooling means and the lubricating means have been disassociated. Sometimes grease was used in the bearings. Grease is not an ideal lubricant for roller-type bearings, because in driving through the grease, the balls or the like heat and tend to carbonize it at high speeds. In some cases, liquid oil was used as a bearing lubricant employing a separate oil-pressure system therefor. The latter procedure complicated the oil-circulating system and generally required an excessively large pump motor.

Due to the present invention, a single improved oil-pressure circulating system may be employed for circulating the oil for cooling and for bearing lubrication. The new construction avoids said large pump motor and affords a sufficient amount (without excess) of oil in mist or vapor form for bearing lubrication, which is conducted in an improved manner through the bearings. Such oil mist lubrication is superior to former lubrication of such machines by grease, or by a flow of liquid oil under pressure in the bearings.

Referring now more particularly to the drawings, numeral 1 indicates a vapor-tight casing of the machine, consisting of two joined magnetic rings 3, adapted to sandwich and support a central annular exciter coil 5. At the ends of the bolted asembly 3 are bolted closure members 7 and 9. A drive shaft 11 is supported in a central antifriction ball bearing 13 within the closure member 9. Bearing 13 is exteriorly sealed off by a cover plate 14. Supported on a central antifriction ball bearing 15 in the closure member 7 is a driven shaft 17. At 19 are indicated coaxial eddy-current inductor drum-forming members. These are joined by a ring 21 in which are openings 23, located in the plane of the coil 5 opposite a gap 25 between rings 3. Ring 21 may be nonmagnetic, or if magnetic, then thin enough substantially to restrict flow of magnetic flux therethrough.

Bolted to the left end of the drum assembly 19 is a spider 27 which is supported on a central antifriction ball bearing 29 carried in a hub 31 of the closure member 7. At 33 are shown close-running flanges operative between members 27 and 31. Welded to the other end of the drum assembly 19 is a disc 35 which is bolted to a flange 37 on the shaft 11. Between the disc 35 and a reduced end of the shaft 17 there is located a central antifriction pilot ball bearing 39. An outlet opening 41 connects the space around bearing 39 with the interior of the casing 1. An outlet opening 43 also connects the space around bearing 13 with the interior of the casing 1. Another outlet opening 45 connects the space around and between bearings 15 and 29 with the interior of the drum 19. This space is exteriorly enclosed by a cover plate 47 applied to the closure member 7 around shaft 17. This plate 47 on its upper side is connected by a pipe 49 with the space in the upper portion of the casing 1. The lower portion of the plate 47 is also connected by a pipe 51 with a hollow space 53 in the closure member 7 and surrounding the hub 31.

Keyed to the shaft 17, as shown at 55, is a field pole member 57 having axially disposed pole-forming teeth 59 adjacent the inner surface of the inductor drum assembly 19. An oil inlet to the hollow space 53 is indicated at 61. An oil outlet from said space 53 is indicated at 63. Oil flow from the outlet 63 can pass through openings 65 in the member 27 and into the interior of the drum assembly 19. In order to enforce circulation and escape of this oil, the margin of the disc 35, where it is welded to the drum assembly 19, is provided with spaced radial turbine impeller blades 67, beveled as shown at 69 and between them forming outlets 71.

When coil 5 is excited, a toroidal flux field surrounds it and interlinks members 3, 19 and 59, all of which are magnetic. This field is polarized in the gap between the poles and the interior surfaces of drum 19. In operation, the shaft 11 drives the doubly supported drum 19. Due to said polarization, eddy currents are generated in the drum assembly 19, with resultant heating. The reactive flux field therein drives the field member 57 and therefore also shaft 17. Any oil pumped into the inlet 61 will flow through the hollow space 53, openings 63 and 65 and thence into the drum assembly 19. Oil flowing through the drum assembly 19 is centrifugally forced against its inside and progresses to its outlets 71 where it is centrifugally impelled or forced or pumped out radially by the turbine blades 67. This escaped oil is directed tangentially to an outlet 73 located at the bottom and to one side of the casing 1, as shown in FIG. 1. Thus there is a centrifugal pumping action toward this outlet, with some air-aspirating effect tending to reduce pressure in the casing. Opposite the outlet 73 in casing 1 is an air inlet 75 adapted to offset this pressure reduction.

Since, under driving conditions, relative motion exists between the pole-forming teeth 59 and drum 19, and also between the impeller blades 67 and the casing 1, an oil mist is generated within the drum 19, at the openings 23 and at the outlet openings 71. The resulting volume of mist is employed for bearing lubrication. The flanges 33 discourage entry of the mist from inside of drum 19 into the right-hand end of the space surrounding bearings 15 and 29. Some of the volume of mist between the casing 1 and drum 19 enters pipe 49 and passes through bearings 15 and 29 in sleeve 31 and into the drum 19 through port 45. A certain amount of it also may pass through pipe 51 from the space at the left of bearing 15 and into the hollow space 53 for pasasge to the inside of the drum assembly 19 through openings 63 and 65. The mist that circulates through bearings 15 and 29 is sufficient to lubricate them, any excess circulating back into drum 19.

A portion of the mist formed in the drum assembly 19 passes into the right-hand bearing 39 at the open entry thereto at 77, escaping into the casing 1 through port 41. Part of the mist in the casing 1 enters the left end of bearing 13 and returns to the casing through port 43.

It will be observed from the drawings that, unlike most grease-packed bearings supplied today, the central ball bearings 13, 15, 29, 39 do not have the usual self-contained end seals for retaining grease, nor do they have grease in them. However, sealed grease bearings may be adapted to use herein by removing their seals or by puncturing the seals, and in either case removing the grease so that the seals are rendered useless as dams, whereby the oil mist described herein may circulate freely therethrough. In the drawings the bearings are shown for example without any seals.

Figure 2:
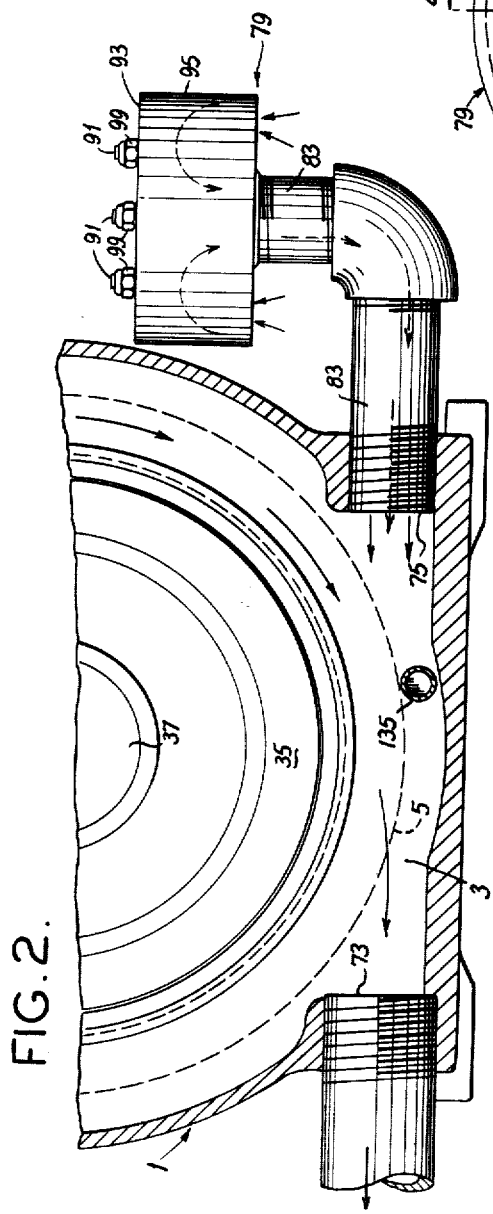
FIG. 2 is a fragmentary cross section taken on line 2—2 of FIG. 1.
Figure 4:
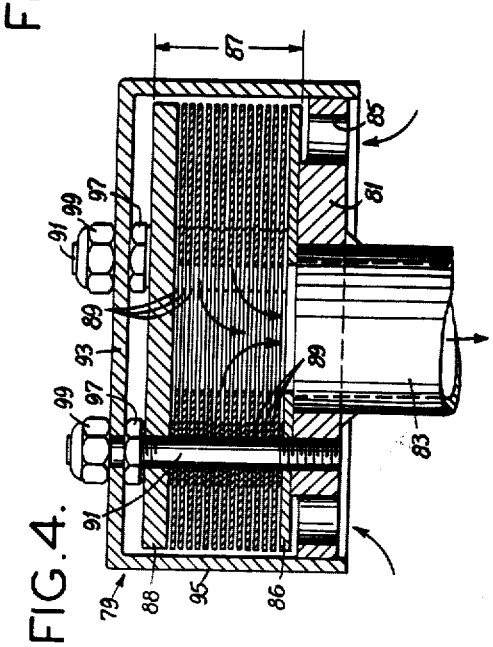
FIG. 4 is a cross section taken on line 4—4 of FIG. 3.

It will be understood that, while air is aspirated into the inlet 75 to offset reduction in inside pressure due to the pumping action, the fanning actions of the polar teeth 59 and of the impeller blades 67 exert a circulating or pumping action of the oil liquid and mist toward and into the outlet 73 (FIG. 2). The introduction of this air may generate a combustible mixture in the machine which could possibly be ignited by some unusual failure in the electrical system therein. The machine is built heavily enough to prevent any resulting internal pressure rise from breaking it. However, to prevent any resulting flame from spurting from the inlet 75, it is provided with a metallic flame suppressor shown generally at numeral 79.

Flame suppressor 79 consists of a base plate 81, welded to the end of a pipe 83 that extends to the inlet 75. The plate 81 has air inlets 85 and carries thereon a stack of annular plates 87, separated by spacer washers 89 located around pillar bolts 91. The bolts 91 pass through openings in the washers 89 and in the plates 87 and are threaded into the base plate 81. For rigidity, the lowermost and uppermost members 86 and 88 of the stack of plates 87 are made heavier than the remainder, the uppermost plate 88 being held down by nuts 97 on the bolts 91. A cover 93, having a skirt 95 closely surrounding and contacting the base plate 81 but spaced from plates 87, is supported on the nuts 97 of the bolts 91. Lock nuts 99, on the upper ends of the bolts 91, hold the cover in place. Thus any backfire or flashback through the flame suppressor 79 is subject to a large area of heat absorption and cooling below flame-supporting temperatures. This makes the coupling safe for use in explosively hazardous surrounding atmospheres.

Referring again to FIG. 1, there is shown an oil-circulating system for the electric coupling. This system consists of an oil sump 101 connected by suction pipe 103 with an oil pump 105. The pressure outlet 107 of the pump (having a pressure gauge 109) passes through a pressure relief valve 111 to a line 113 leading to a heat exchanger or radiator 115 cooled by air from a fan 117 driven by a motor 119. Valve 111 opens if, due to clogged lines or the like, the pressure rises unduly. When open, it sends oil back to the sump 101 via pipe 127. A suitable driving motor 121 is provided for the pump 105 which is smaller than motors which would be required if lubrication were to be accomplished by leading liquid-oil under pressure to closed bearings such as, for example, sleeve bearings.

Cooled oil from the radiator or heat exchanger 115 is led through a line 123 to the inlet 61. This line includes a control device 124 of the type known as a minimum-flow-controlled switch. This consists of a flow-controlled portion 125 and an operatively connected switch portion 126. Switch portion 126 is connected between terminals of a circuit portion 139. Prescribed flow through line 123, sufficient for cooling the portion 125, responds to operate switch 126 to close, for example. Below this minimum prescribed flow, the switch 126 changes its position, to open for example. Further details of the device 124 are unnecessary, since it is of a known construction.

The circuit 139 is connected into the usual circuit, including coil 5 as a portion thereof. Operation of switch portion 126 in response to minimum prescribed flow prepares the coil circuit for excitation. In response to less than minimum prescribed flow, the coil is deexcited. Other portions than coil 5 of the exciter circuit are not shown, being of known type such as, for example, shown in U.S. Patents Re. 22,432, 2,277,284, 2,697,794 and others. For example, the switch 126 might be in a line such as 49 in 2,697,794 and open in response to less than minimum prescribed flow. As shown in said patents, the additional parts of the coil exciting circuit may include speed-regulating means.

Oil is returned to the sump 101 from the outlet 73 of the casing 1 through a circulating return line 129. Line 123 has a line connection 131 with line 129 in which is located a thermostatic proportioning valve 133. At 135 is shown a temperature-responsive liquid-filled bulb connected through liquid line 137 with the valve 133. The parts 133, 135, 137 per se are of known type. As the temperature of the oil discharged through opening 73 affects bulb 135, the hydraulic pressure in line 137 is changed and the position of valve 133 is thereby controlled. As the discharge temperature of the oil flowing to the outlet 73 increases, the valve 133 will tend to close and reduce return flow from line 123 to line 129. This diverts more oil into line 223. As the temperature decreases, the valve will tend to open, thus reducing flow to line 223. If the temperature of oil in the casing 1 increases above central point, more coolant oil will be sent through the coupling to control this temperature; conversely, if the temperature decreases below control point, less will be sent through. The purpose of this is to prevent overheating caused by an inadequate oil supply or an excess of oil such as may be caused by overcooling. Any excessive oil should be avoided to prevent too great a radial depth of oil on the inside of the cylinders 19 which, if allowed to occur, would cause excessive dipping therein of the polar teeth 59, with consequent undesirable hydraulic coupling effect between the drum assembly 27, 19, 35 on the one hand, and the polar field member 57. Such hydraulic coupling action invites unsteady operation, particularly under conditions of automatic electrical speed control, such as may be used in the exciting circuit for coil 5.

Operation is as follows:

Pump 105 draws oil from sump 101 and sends it under suitable pressure to the inlet 61 through the relief valve 111, heat exchanger 115 and flow switch device 124. When the pressure condition for minimum predetermined flow to avoid burn-out is reached, flow control device 124 closes its switch 126 in line 139, thus closing the excitation circuit for coil 5. Then with shaft 11 driving, an electric coupling is made as above described so that shaft 17 is driven. The usual electric control circuit is set at the desired speed for shaft 17 and maintains the excitation of coil 5 at the proper value under varying conditions, for example load change. Oil entering the inlet 61 passes through the hollow space of the closure member 7 and flows through openings 63 and 65 and is thence centrifugally spun out against the inside of drum 19, progressing to the right at a suitable radial depth and being pumped by blades 67 through the outlets 71 into the casing 1. The centrifugal action diverts liquid flow from the central bearings 15, 29, 139 and 13.

In the above process, oil mist is generated, in part by action of the polar teeth 59 and the splashing oil escaping through ports 23, and in part by blades 67. That from ports 23 moves axially in the cylindrical gap between parts 3 and 19. The result is a supply of mist not only in the drum 19 and in the right-hand end of the casing 1, outside of cylinder 19, but also in the left-hand end of the latter outside of the drum. Some mist is forced from drum 19 through the bearing 39 and outlet 41 into the lower right-hand end of casing 1. Some at the upper right-hand end of casing 1 is forced through bearing 13 and returns to the lower right-hand end of casing 1 through opening 43. Mist in the upper left-hand end of casing 1 flows through pipe 49 to the left end of bearing 15. It then passes through both bearings 15 and 29 and returns to the inside of the drum 19 via opening 45. Some also returns to the inside of casing 1 via pipe 51, passage 53 and openings 63 and 65. Thus the mist formed in the drum 19 is augmented by this entering mist flow. Stagnation of mist circulation in bearings 15 and 29 is prevented by the blocking action of the dams 33 against entry of mist into the downstream portions of the space containing these bearings.

The oil flowing through the drum 19 cools it and in passing through the outlet 73 affects the temperature-sensitive bulb 135 to control valve 133. If the temperature is low, indicating an excessive amount of oil, valve 133 tends to open so that more oil is returned directly to the sump 101 via lines 131 and 129. This reduces the flow into the drum 19. If the flow becomes too small, the temperature will rise at the outlet 73, thus affecting bulb 135 in a manner to cause valve 133 to restrict return flow through connection 131 and increasing the flow to the inlet 61.

The present structure has advantages over former ones in which either a pump such as 105 was normally required to pump oil for cooling and into closed bearings for lubrication or a separate pumping system was employed for bearing lubrication. This required larger pump capacity and/or complications in the coupling structure. In the present structure, the mist lubrication of the bearings engenders little back pressure to oil flow from the pump circuit, improves the lubricating function itself and simplifies the means for getting lubricant to the bearings.

The term mist as used herein includes vapor. The term roller bearing means antifriction bearings employing rollers of any desired shape, such as balls, cylinders, cones and the like. The term open-type bearing means one through which mist or vapor may freely circulate.

In view of the above, it will be seen that the several objects of the invention are achieved and other advantageous results attained.

As various changes could be made in the above constructions without departing from the scope of the invention, it is intended that all matter contained in the above descritpion or shown in the accompanying drawings shall be interpreted as illustrative and not in a limiting sense.

I claim:

1. An electric coupling comprising an enclosing vapor-tight casing having end supports for first and second sets of roller-type end bearings and a third roller-type bearing, driving and driven shafts supported in said first and second bearings respectively, said driven shaft supporting a field pole member, a drum in the casing surrounding said field pole member and supported at one end by said third bearing, a fourth roller-type pilot bearing between the drum and the pole member, said casing having inlet and outlet ports, means adapted to admit lubricating coolant from said inlet port into the drum at one end thereof and exit means therefor at the other end of the drum, whereby liquid coolant is circulated through the drum between it and said pole member while forming a lubricant mist inside and outside the drum, means adapted to carry some of the mist through said second and third bearing from the casing and into the drum, means adapted to carry some of the mist from the drum into the casing through said fourth bearing, and means for establishing circulation of some of said mist from and to the drum through said first bearing.

2. Electric apparatus comprising a liquid- and vapor-tight casing having an inlet toward one end and an outlet toward the other end for flow therethrough of lubricating coolant in liquid and mist form an eddy-current drum in said casing having an inlet adjacent the casing inlet and an outlet adjacent the casing outlet for liquid flow therethrough, a relatively rotatable field pole member in said drum with its poles adjacent thereto and adapted upon its rotation with that of the drum centrifugally to force liquid from the center of the apparatus to flow along the inside of the drum, then centrifugally therefrom to said outlet and to form a volume of mist from the liquid in the drum, said drum having an impeller at its outlet, said impeller inducing flow of liquid and mist from said drum into the casing and forming an additional volume of mist from said liquid, central open roller-type bearings in the casing adapted to support said drum and field pole member, said casing and drum being formed with passage means adapted to lead the mist through said bearings, said liquid by its centrifugal flow being substantially diverted from said bearings.

3. An electric coupling comprising an enclosing casing, driving and driven shafts, relatively rotary eddy-current inductor drum and field pole members located in the casing and respectively connected to said shafts, said field pole member being located within the inductor drum member, sets of antifriction roller bearings supporting the shafts and said members for relative rotation within the casing, means adapted to move lubricating coolant into the drum member at one end thereof within the casing and from the other end thereof into the casing, said relative movements being adapted to generate coolant mist in the casing both within and outside of said drum member and to circulate the coolant in both liquid and mist form within the casing, said casing having a coolant outlet, means adapted to lead circulating mist from both the inside and outside of said drum member through respective ones of the bearings, said casing also having an air vent located at a point opposite said coolant outlet thereof, the rotation of said drum member being such as to induce flow in a direction from said vent location to said coolant outlet.

4. Electric apparatus comprising a liquid- and vapor-tight casing having an inlet toward one end and an outlet toward the other end for flow therethrough of lubricating coolant in liquid and mist form, an eddy-current drum in said casing having an inlet adjacent the casing inlet and an outlet adjacent the casing outlet for liquid flow therethrough, said drum outlet being adapted centrifugally to impel liquid from the center of the apparatus outward into the casing for flow from the casing outlet, a relatively rotatable field pole member in said drum with its poles adjacent thereto, rotary motions of the drum and the pole member being adapted to form a mist from said liquid, central roller bearings supporting said drum located toward the inlet and outlet ends of the casing, a central roller bearing at the inlet end of the casing supporting said pole member, and a central roller pilot bearing at the outlet end of said drum also supporting said pole member within the drum near its outlet, means establishing a comparatively free passage for flow of mist from the interior of the drum through said pilot bearing and to the casing, and means establishing comparatively free flows of mist from the casing and through the remaining bearings.

5. Electric apparatus comprising a liquid- and vapor-tight casing supporting an annular field coil and having a liquid inlet toward one end on one side of the coil and a liquid outlet toward the other end on the other side of the coil, an eddy-current drum in said casing and surrounded by said field coil and casing and having an inlet adjacent the casing inlet and an outlet adjacent the casing outlet for liquid flow therethrough, said drum outlet being formed with impellers adapted centrifugally to impel liquid outward from the center of the apparatus into the casing for flow from the casing outlet, a relatively rotatable field pole member in said drum with its poles adjacent thereto and adapted centrifugally to impel liquid outward from the center of the apparatus to the inside surface of the drum, rotary motions of the field poles in the drum and of said impellers being adapted to form a mist from the liquid for lubrication, first and second central roller bearings supporting said drum at the outlet and inlet portions of the casing respectively, a central roller bearing at the inlet portion of the casing supporting said pole member, a central roller pilot bearing at the outlet end of said drum also supporting said pole member within the drum near its outlet, means establishing a comparatively free passage for flow of mist from the interior of the drum through said pilot bearing and to the casing, means establishing a comparatively free flow of mist from said impellers through the first drum-supporting bearing, and means establishing a comparatively free flow of mist from within the casing and between the inside of the casing and the outside of the drum for flow through the remaining bearings and to the inside of the drum.

References Cited in the file of this patent
UNITED STATES PATENTS

| | | |
|---|---|---|
| 2,192,654 | Simmons | Mar. 5, 1940 |
| 2,545,335 | Becker | Mar. 31, 1951 |

FOREIGN PATENTS

| | | |
|---|---|---|
| 243,258 | Italy | Apr. 2, 1926 |
| 665,772 | Great Britain | Jan. 30, 1952 |

UNITED STATES PATENT OFFICE
CERTIFICATE OF CORRECTION

Patent No. 3,089,046                          May 7, 1963

Ralph L. Jaeschke

It is hereby certified that error appears in the above numbered patent requiring correction and that the said Letters Patent should read as corrected below.

Column 4, line 74, for "139" read -- 39 --; column 6, line 7, after "form" insert a comma.

Signed and sealed this 3rd day of December 1963.

(SEAL)
Attest:
ERNEST W. SWIDER

EDWIN L. REYNOLDS

Attesting Officer

Acting Commissioner of Patents